(12) United States Patent
Bourne et al.

(10) Patent No.: US 11,507,591 B2
(45) Date of Patent: *Nov. 22, 2022

(54) METHODS, SYSTEMS, AND COMPUTER READABLE MEDIUMS FOR COMMAND ENGINE EXECUTION

(71) Applicant: EMC IP HOLDING COMPANY LLC, Round Rock, TX (US)

(72) Inventors: Geoffrey David Bourne, Allen, TX (US); Jeffery Jon Hayward, Lucas, TX (US); Jonathan Peter Streete, San Jose, CA (US)

(73) Assignee: EMC IP HOLDING COMPANY LLC, Round Rock, TX (US)

( * ) Notice: Subject to any disclaimer, the term of this patent is extended or adjusted under 35 U.S.C. 154(b) by 146 days.

This patent is subject to a terminal disclaimer.

(21) Appl. No.: 16/775,802

(22) Filed: Jan. 29, 2020

(65) Prior Publication Data
US 2020/0167363 A1 May 28, 2020

Related U.S. Application Data

(63) Continuation of application No. 15/395,878, filed on Dec. 30, 2016, now Pat. No. 10,585,911.

(51) Int. Cl.
*G06F 16/25* (2019.01)
*G06F 16/242* (2019.01)
(Continued)

(52) U.S. Cl.
CPC ........ *G06F 16/258* (2019.01); *G06F 16/2425* (2019.01); *G06F 40/211* (2020.01); *G06F 40/253* (2020.01)

(58) Field of Classification Search
CPC .... G06F 16/258; G06F 17/274; G06F 17/271; G06F 16/2425; G06F 17/30569; G06F 17/30395; G06F 40/253; G06F 40/211
(Continued)

(56) References Cited

U.S. PATENT DOCUMENTS 6,160,988 A * 12/2000 Shroyer ................ H04H 40/90
455/12.1
6,839,669 B1 * 1/2005 Gould ..................... G10L 15/22
704/246
(Continued)

OTHER PUBLICATIONS

Notice of Allowance and Fee(s) Due for U.S. Appl. No. 15/395,878 (dated Nov. 27, 2019).
(Continued)

*Primary Examiner* — Kuen S Lu
(74) *Attorney, Agent, or Firm* — Jenkins, Wilson, Taylor & Hunt, P.A.

(57) ABSTRACT

Methods, systems, and computer readable mediums for command engine execution are disclosed. One method for command engine execution includes receiving free-form information for requesting or modifying information about a computing system. The method also includes identifying a portion in the free-form information that is unsupported by a command engine. The method further includes converting, using a grammar module that supports the portion, the free-form information into at least one compatible command for interacting with at least one data set. The method also includes requesting or modifying the information about the computing system by interacting with the at least one data set using the at least one compatible command.

18 Claims, 6 Drawing Sheets

(51) Int. Cl.
  *G06F 40/211* (2020.01)
  *G06F 40/253* (2020.01)
(58) Field of Classification Search
  USPC .......................................................... 707/756
  See application file for complete search history.

(56) References Cited

U.S. PATENT DOCUMENTS

| | | | | |
|---|---|---|---|---|
| 8,521,766 | B1* | 8/2013 | Hoarty | G06F 16/639 |
| | | | | 707/769 |
| 9,876,730 | B1* | 1/2018 | Ward | H04L 47/70 |
| 10,585,911 | B1 | 3/2020 | Bourne et al. | |
| 2010/0293598 | A1* | 11/2010 | Collart | H04N 21/64753 |
| | | | | 726/3 |
| 2012/0290289 | A1* | 11/2012 | Manera | G06F 16/345 |
| | | | | 704/9 |
| 2017/0357637 | A1* | 12/2017 | Nell | H04L 12/2823 |

OTHER PUBLICATIONS

Advisory Action for U.S. Appl. No. 15/395,878 (dated May 23, 2019).
Final Office Action for U.S. Appl. No. 15/395,878 (dated Mar. 28, 2019).
Non Final Office Action for U.S. Appl. No. 15/395,878 (dated Sep. 27, 2018).

* cited by examiner

| MODULE ID | SUPPORTED VERB(S) | REQUIRED PARAMETER(S) | SUPPORTED PREDICATE(S) | USAGE FILTER(S) | ENDPOINT ID(S) |
|---|---|---|---|---|---|
| NET_12 | SET, REVERT | IP ADDRESS | IP ADDRESS VALUE IS BETWEEN 192.178.10.05 AND 192.178.10.140 | OS TYPE = WINDOWS 10 | IP ADDR '1'; IP ADDR '2' |
| DB_234 | ADD, DELETE, CHANGE | N/A | SCORE > 60 | ELEMENT = X | MSG BUS ID: 345 |

METHODS, SYSTEMS, AND COMPUTER READABLE MEDIUMS FOR COMMAND ENGINE EXECUTION

PRIORITY CLAIM

This application is a continuation of U.S. patent application Ser. No. 15/395,878 filed Dec. 30, 2016, the disclosure of which is incorporated herein by reference in its entirety.

TECHNICAL FIELD

The subject matter described herein relates to command engines. More specifically, the subject matter relates to methods, systems, and computer readable mediums for command engine execution.

BACKGROUND

Management software can include user interfaces (UIs) and/or graphical user interfaces (GUIs) for managing, monitoring, viewing, and/or configuring one or more components (e.g., physical resources and/or virtual resources) within or associated with a computing system, e.g., a backend computing system separate from the management software. Such management software can also include functionality that allows a user to manage and/or query a specific element or entity in the computing system. In many cases however a user command regarding multiple system elements and/or involving derived commands (e.g., sub-commands) is unable to return results efficiently. Further, a user command is generally required to use a rigid syntax, which can be hardcoded in the management software and, therefore, difficult and/or expensive to change.

SUMMARY

Methods, systems, and computer readable mediums for command engine execution are disclosed. One method for command engine execution includes receiving free-form information for requesting or modifying information about a computing system. The method also includes identifying a portion in the free-form information that is unsupported by a command engine. The method further includes converting, using a grammar module that supports the portion, the free-form information into at least one compatible command for interacting with at least one data set. The method also includes requesting or modifying the information about the computing system by interacting with the at least one data set using the at least one compatible command.

BRIEF DESCRIPTION OF THE DRAWINGS

The subject matter described herein will now be explained with reference to the accompanying drawings of which:

FIG. 3 is a diagram illustrating example grammar module registry data;

DETAILED DESCRIPTION

Figure 1:
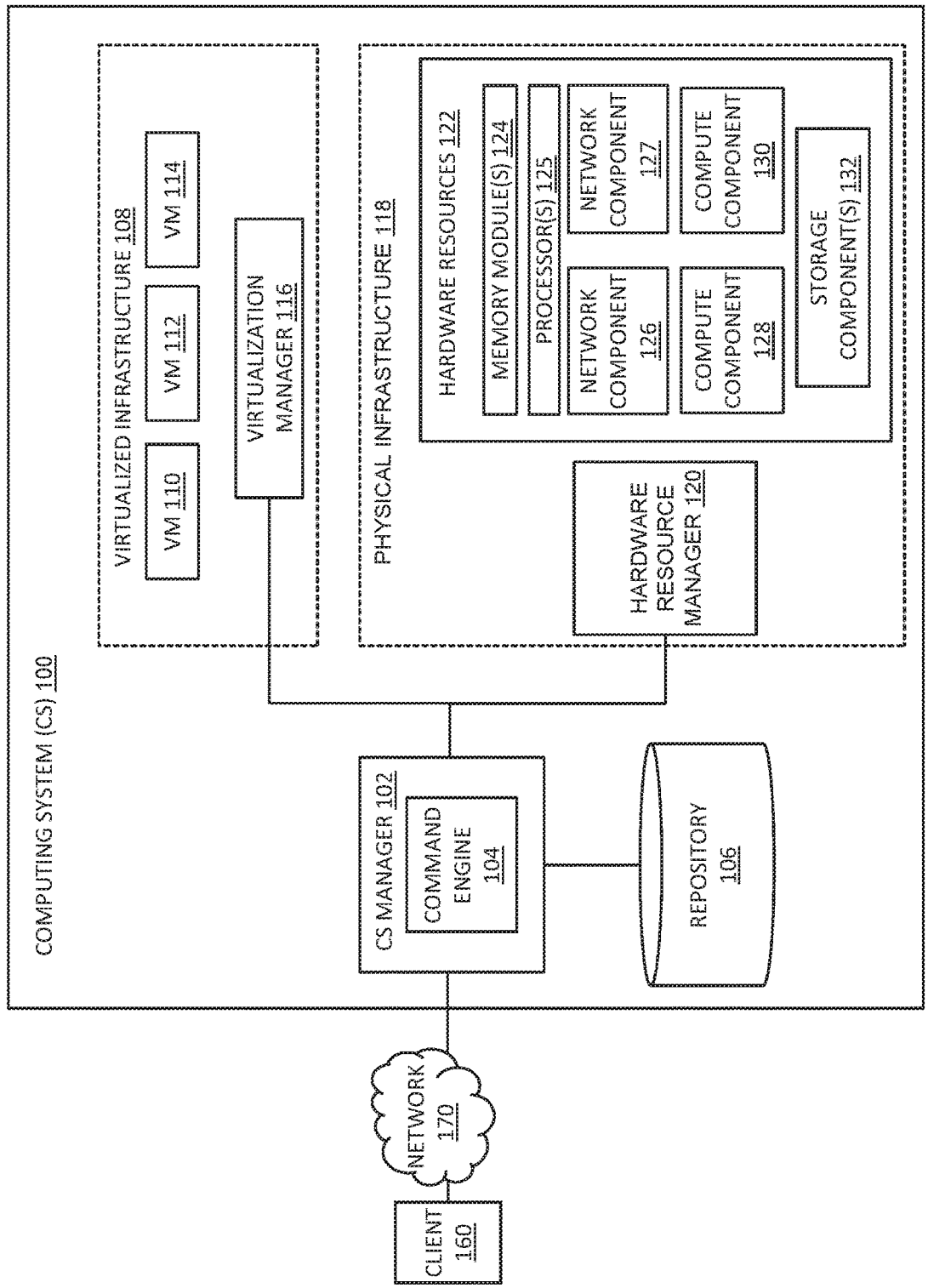
FIG. 1 is a diagram illustrating an example computing system.

The subject matter described herein relates to methods, systems, and computer readable mediums for command engine execution. Some management software includes tools for discovering and managing computing systems. For example, management software can include a search tool for discovering a specific computing system component, such as element, physical resource, and/or virtual resource in a computer system or group of computing systems. However, conventional management tools generally require rigid input including specific commands, instructions, criteria, and related identifiers, which can require significant amounts of domain knowledge, experience, and/or research by a user to perform adequate searching.

Another issue involving conventional management tools is the use of static, predefined interfaces for commands and/or refining a given command (e.g., a search query or an update command). For example, some management systems can use traditional, silo-based storage area network (SAN) tools based on form-driven narrow searches, spreadsheets, and manual processing by an operator for cross correlating and/or associating different data from various sources. As such, users must generally spend significant time and/or resources to search for needed information and/or to solve a specific issue using conventional management tools. Moreover, issues can be acerbated when the number of systems, CSCs, and/or networks increase and/or where systems and/or networks are located in different places, e.g., in different rooms, states, and/or countries.

In accordance with some aspects of the disclosed subject matter, functionality for command engine execution can involve interacting with one or more computing systems, such as converged infrastructure system (CISs) and/or integrated infrastructure systems (e.g., a Vblock® System from Dell EMC), and/or computing system components (CSCs) therein. For example, a CIS can comprise multiple CSCs, such as physical resources and/or virtual resources, in a preconfigured or prepackaged computing platform, where some CSCs are developed and/or manufactured by multiple entities. For example, an example CIS can comprise data storage devices, servers, networking equipment, and software for managing physical resources and/or virtualized resources (e.g., virtual servers). As indicated in the following disclosure, any computing system (e.g., a CIS, an integrated infrastructure system, or other computing system or device) can be utilized without departing from the scope of the present subject matter.

In accordance with some aspects of the disclosed subject matter, a computing platform (e.g., a node or device) or module (e.g., firmware, hardware, and/or software executing on a processor) can include functionality for command engine execution involving one or more grammar modules. For example, a command engine in accordance with aspects of the disclosed subject matter can identify and utilize an appropriate grammar module by querying a grammar module registry during run-time to obtain communication information (e.g., a network address) for a grammar module that can help analyze and/or convert a free-form command into one or more appropriate formats for interacting with relevant data sets. In another example, a command engine in accordance with aspects of the disclosed subject matter can identify and utilize an appropriate grammar module by sending, to grammar modules, grammar processing requests for requesting assistance with processing free-form information, where each of the grammar modules may be configured to respond to grammar processing requests when it is capable of assisting with processing.

In accordance with some aspects of the disclosed subject matter, functionality for command engine execution can provide relevant command results quickly, e.g., at or near real-time. For example, a command engine in accordance with aspects of the disclosed subject matter can be configured to quickly and efficiently query or modify relevant data sets and to obtain and/or derive related information (e.g., contextually relevant) associated with the query. In this example, the related information can be stored in a graph database and can be determined by identifying relationships between two or more data elements in the graph database.

In accordance with some aspects of the disclosed subject matter, a computing platform (e.g., a node or device) or module (e.g., firmware, hardware, and/or software executing on a processor) can include functionality for processing a free-form command in stages, e.g., each stage can include one or more related queries (e.g., sub-commands) that identify a (e.g., narrowed) data set or criteria usable by subsequent queries. For example, command engine 104 can generate sub-commands or actions based on one or more command-obtained data sets. In this example, command engine 104 can generated a query configured to use results (e.g., a list of IP addresses) of a prior stage or sub-command for gathering additional and/or refined data, e.g., data that meets various criteria determined using progressively smaller data sets.

Advantageously, by utilizing syntax and/or grammar modules dynamically, some aspects of the disclosed subject matter can allow a user to quickly and efficiently manage (e.g., query, provision, modify, etc.) one or more computing systems and/or CSCs therein without requiring the user to know or learn a large amount of domain knowledge (e.g., knowledge about data sets containing requested information and/or related data management systems). For example, rather than present a rigid and/or limited command syntax, a command engine in accordance with aspects of the disclosed subject matter can use one or more grammar modules to further extend or enhance command syntax and/or grammar for various use cases, data types, CSCs, or scenarios.

Further, by processing a free-form command in stages that can utilize command-obtained data sets, some aspects of the disclosed subject matter can provide command results that increase user productivity and/or efficiency. For example, rather than require a user to manually input results from prior commands (e.g., search queries) in one or more subsequent commands to obtain some specific (e.g., refined) data set, a command engine in accordance with aspects of the disclosed subject matter can be configured to utilize command-obtained data sets in subsequent stages using a free-form command (e.g., a natural language command or query that is processed using recursive-like sub-commands for obtaining a final data set).

Reference will now be made in detail to example embodiments of the subject matter described herein, examples of which are illustrated in the accompanying drawings. Wherever possible, the same reference numbers will be used throughout the drawings to refer to the same or like parts.

FIG. 1 is a block diagram illustrating an example computing system (CS) 100. Although the following disclosure describes the use of CS 100, any type of computer system, e.g., a CIS, can be utilized without departing from the scope of the present subject matter. CS 100 can comprise CSCs, such as virtual resources and physical (e.g., hardware) resources. Example physical resources can comprise a processor, a memory module, a compute component, a network component, a storage component, a server, network equipment, a router, a switch, wiring or cabling, a storage device, a physical port, and/or a communications interface. Example virtual resources can comprise a virtual entity (e.g., an entity that appears as a physical entity but comprises one or more components associated with one or more CSs), a virtual machine, a virtual server, a virtual storage device, a virtual port, and/or a virtual communications interface. CS 100 can also comprise software and related components for managing the CS and/or portions (e.g., CSCs) therein.

In some embodiments, CS 100 can be configured to provide data management functionality, cloud service functionality, and/or other functionality. CS 100 can be capable of communicating with other CSs (e.g., located at various physical locations or sites) and can communicate with various other entities, such as network nodes (e.g., servers hosting online sites) and users. For example, client 160 can represent any entity (e.g., software executing on a processor, a web-based interface, etc.) for allowing a user (e.g., a human operator or an automated system) to interact with CS 100, CSCs therein, and/or other entities. In some embodiments, client 160 can communicate directly with CS 100 with or without using network 170.

In some embodiments, CS 100 can comprise a CS manager 102, a repository 106, virtualized infrastructure 108, and/or physical infrastructure 118. CS manager 102 can be any suitable entity for managing aspects of CS 100 or portions therein (e.g., CSCs or groups of CSCs). CS manager 102 can be configured to communicate with various CSCs and/or for managing various CSCs. For example, CS manager 102 can be configured to access each CSC within CS 100 and return relevant information to client 160. For example, CS manager 102 can be configured to manage performance, resource utilization levels, and other aspects associated with virtualized infrastructure 108 and/or physical infrastructure 118. In some embodiments, CS manager 102 can comprise VCE Vision™ Intelligent Operations software and/or firmware.

In some embodiments, CS manager 102 can include a converged infrastructure management application for interacting with CS 100 and/or CSCs therein. In such embodiments, the converged infrastructure management application can include or provide a graphical user interface (GUI), a command-line interface (CLI), an application programming interface (API), and/or or other communications interface. For example, a converged infrastructure management application can provide a web-based GUI containing a command page for inputting information for command engine execution and/or for displaying command results associated with the free-form command.

CS manager 102 can comprise or interact with a command engine 104. Command engine 104 can be any suitable entity (e.g., hardware, firmware, and/or software executing on a processor) for performing one or more aspects associated with command execution. For example, command engine 104 can be configured to receive input (e.g., a natural language query or command) from a user for requesting or modifying information about CS or a CSC therein, to convert or transform the user input into at least one compatible command for requesting or modifying information from at least one data set, and to provide results associated with the command to the user.

In some embodiments, command engine 104 can include functionality for receiving, analyzing, and/or processing free-form (e.g., natural language and/or semi-natural language) commands. For example, if a user (e.g., at client 160) is looking to provision storage for a large number of workloads, the user may need to determine which CS has capacity to handle the workloads, e.g., among a group of CSs that the user manages. In this example, a free-form command, such as "find storage in Raleigh, N.C. with remaining capacity greater than 80%", can be usable to quickly request an appropriate CS in a particular location without any knowledge of how or where the requested information is stored. Continuing with the example, command engine 104 can use the free-form command to provide results usable for performing the provisioning operation.

In some embodiments, command engine 104 can include functionality for managing, configuring, and/or provisioning aspects associated with physical infrastructure 118. For example, command engine 104 can be configured to provision hardware resources 122 via one or more communications interfaces for implementing physical entities in physical infrastructure 118 and/or virtual entities in virtualized infrastructure 108. In this example, a free-form command, such as "Set system 'XYZ' to use a storage device in Raleigh, N.C. with at least 100 gigabytes (GBs) free", can be used by command engine 104 to trigger and/or perform the provisioning operation.

In some embodiments, command engine 104 can include or utilize one or more communications interfaces, e.g., a GUI, a CLI, an API, or other interface, for receiving and sending command related information (e.g., commands, command results, and/or other information). For example, a user can request, using a representation state transfer (REST) API related message, information about a particular CS or CSC therein using a free-form command. In this example, command engine 104 can provide, using a REST API related message, command results associated with the free-form command. In another example, user can input a free-form command using web-based interface, such as a web page, a file (e.g., an XML file), or other interface. In yet another example, an application (e.g., a third-party management application) can interact with command engine 104 for requesting or modifying information about a particular CS or CSC by providing free-form information, e.g., via an API or other interface.

In some embodiments, command engine 104 can include functionality for processing a free-form command and for interpreting information in the free-form command so as to identify information usable for generating non-free-form (e.g., machine understandable) commands. For example, command engine 104 can include a processing engine (e.g., a parser, a grammar-driven analyzer, and/or software, like ANother Tool for Language Recognition (ANTLR), executing on a processor) for performing grammar processing associated with a free-form command. In this example, command engine 104 can process the free-form command by performing a lexical and/or structural (e.g., syntactical) interpretation such that the interpretation becomes unambiguous, yet tolerant of natural language sentence structure, e.g., by accepting, yet disregarding or ignoring, certain words, such as "the", "with", "for", etc.

In some embodiments, command engine 104 can include functionality for utilizing grammar modules. For example, command engine 104 or a module therein can be configured with a predefined syntax with supported grammar. For example, a predefined syntax can recognize or support a number of words or verbs that can be interpreted into machine or computer understandable actions. In this example, if a free-form command includes unsupported portions (e.g., words or phrases in the command), command engine 104 or a module therein can query a grammar module registry for information about one or more grammar modules that support these portions. Continuing with this example, after receiving information about these one or more grammar modules, command engine 104 or a module therein can utilize these grammar modules to extend its native syntax and grammar capabilities so as to process and/or interpret the free-form command.

In some embodiments, command engine 104 or an entity therein can generate an abstract syntax tree (AST), also referred to herein as a phrasing tree, associated with a free-form command. For example, a free-form command (e.g., a natural language command for requesting information or modifying (e.g., configuring) information) can include various combinations of analytical, geospatial, and/or categorical phrasings (e.g., action words, instructions, and/or criteria). In this example, command engine 104 can convert the free-form command into a phrasing tree that stands independent of any particular grammar specification, data set, or data management system. Continuing with this example, command engine 104 can use the phrasing tree for generating non-free-form (e.g., machine-readable or machine-actionable) commands, such as a structured query language (SQL) query, a NoSQL query, an extensible markup language (XML)-based command, a simple network management protocol (SNMP) command, a proprietary command, or another command, usable for interacting with one or more data management systems and/or for interacting with one or more data sets.

In some embodiments, command engine 104 or an entity therein can generate one or more non-free-form commands associated with a free-form command. For example, command engine 104 can be configured to generate, using a phrasing tree, commands that are compatible with one or more data management system and can use the generated commands for obtaining command results and/or related information. In this example, command engine 104 can be configured to generate the command based on preconfigured command generation rules associated with a relevant phrasing tree, data set, or data management system. In another example, command engine 104 can be configured to generate a command based on information (e.g., hints) from a user or other entity, e.g., a network operator, a network management system, and/or repository 106. In yet another example, command engine 104 can be configured to generate, using information from a phrasing tree, a command based on various techniques, such as artificial intelligence or machine learning (e.g., logic that changes based on experiences and/or context), machine trial-and-error, and/or historical information (e.g., previous valid, compatible commands).

In some embodiments, command engine 104 can process a free-form command in stages, where each stage can include one or more related commands (e.g., sub-commands) that identify a (e.g., narrowed) data set or criteria usable by subsequent commands. For example, command engine 104 can use a free-form command to generate sub-commands or actions based on one or more command-obtained data sets. In this example, command engine 104 can generated one or more queries based on a user-generated free-form command. Continuing with this example, at least one generated query can be configured to use results (e.g., a list of IP addresses) of a prior stage or command for gathering additional and/or refined data, e.g., data that meets various criteria determined using progressively smaller data sets.

In some embodiments, command engine 104 can include functionality for performing query processing and/or analyses associated with a phrasing tree. For example, after generating a phrasing tree associated with a free-form command, command engine 104 can perform a query analysis for determining what type and how many non-free-form commands are needed for satisfying (e.g., answering) a free-form command. In another example, command engine 104 can perform a query analysis for obtaining or gathering additional information (e.g., relational information) such that one or more non-free-form commands can be generated. In this example, obtaining or gathering additional information can include requesting the additional information from a user and/or generating supplemental queries for obtaining the additional information.

Example types of non-free-form commands for updating data can include a flat update command and a relational update command. A flat update command can include a command for modifying a single data set and can provide a command response indicating whether the modification was successful and how many records were modified and/or provide a result set including modified data values in a tabular or semi-structured format. For example, a flat SQL update command can be "UPDATE Employee_Table SET ID=34 WHERE SSN='234-22-3333'", where a command response can indicate that one record has been updated. A relational command can include a command that results in querying multiple tables or data sets and can require relational information to obtain accurate results. For example, a relational SQL update command can be "UPDATE Employee_Table SET Employee_Table.salary=Wage_Table.salary FROM Employee_Table, Wage_Table WHERE Employee_Table.ID=Wages_Table.ID and Employee_Table.ID=34". In this example, the where portion of the SQL update command includes relational information (e.g., an employee identifier) that links information associated with the same person in two tables, Employee_Table and Wage_Table.

Example types of non-free-form commands for querying data can include a flat query and a relational query. A flat query can include a query for querying a single data set and can provide a result set including data values in a tabular or semi-structured format. For example, an example flat SQL query can be "Select Name from Employee_Table", where a result set can include a list of names stored in a table named "Employee Table". A relational query can include a query that results in querying multiple tables or data sets and can require relational information to obtain accurate results. For example, an example relational SQL query can be "Select Employee_Table.Name, Wage_Table.Amount from Employee_Table, Wage_Table where Employee_Table.EmpolyeeID=Wage_Table.EmpolyeeID. In this example, the where portion of the SQL query includes relational information (e.g., an employee identifier) that links information associated with the same person in two tables, Employee_Table and Wage_Table.

In some embodiments, command engine 104 can include functionality for querying, modifying, traversing, and/or utilizing an unstructured or semi-structured data structure. For example, command engine 104 can include a processing engine (e.g., a data set management system and/or Elasticsearch software executing on a processor) for receiving a command or other information and using the information to query or modify an unstructured data structure, such as a JavaScript object notation (JSON) document or a semi-structured data object.

In some embodiments, a command can be constructed or generated by identifying an information domain (e.g., scope, table, etc.) and one or more constraints (e.g., filters, ranges, locations, etc.) using information from a phrasing tree and translating that into a compatible command for interacting with a particular data set. For example, command engine 104 can implement or utilize an unstructured data set, where elements (e.g., tables, entities, information, etc.) of a domain are stored as semi-structured data objects (e.g., JSON documents). In this example, the content to be queried or modified, which is inserted into and managed by the data set management system, can be a series of distinct documents that correspond to either a physical or logical element in the solution domain and can be composed of informational, categorical, and numerical fields. Continuing with the example, command engine 104 can use a compatible command for obtaining information from the semi-structured data objects.

In some embodiments, command engine 104 can include functionality for querying, modifying, traversing, and/or utilizing a graph related data structure. For example, command engine 104 can include a processing engine (e.g., a graph data set management system and/or graph database software (e.g., Titan) executing on a processor) for receiving a query or other information and using the information to query or modify a graph related data structure, such as data elements stored in a graph database.

In some embodiments, a graph related data structure can include data elements, edges, and properties for representing and/or storing data. In this example, each data element can represent a CSC, a computing system, CS 100, or another entity and can include associated properties or attributes. Continuing with this example, relationships between the data elements can be represented as connections or edges connecting the data elements.

In some embodiments, a command can be constructed or generated for obtaining or identifying relationships between data, data sets, or data objects. For example, command engine 104 can identify relationships between portions of free-form information and can use this information in generating a relational command and/or for traversing data elements and edges in a graph database. In this example, after identifying relevant relationships, a relational command can use the relationships and/or additional information for obtaining or modifying relevant data associated with the free-form information.

In some embodiments, command engine 104 or an entity therein can provide and/or present (e.g., to a user) contextually relevant information associated with a free-form command. For example, command engine 104 can request and obtain information that is not explicitly requested in a free-form command, such as performance indicators and aggregations of such indicators. In this example, command engine 104 can use a variety of factors (e.g., predetermined rules, artificial intelligence, historical information, and/or user preferences) for determining which, if any, additional information should be provided to a user. In some embodiments, command engine 104 can be configured to interact with one or more data sets and/or use (e.g., traverse) a graph database to obtain, identify, derive, or modify additional relevant information, e.g., information that is logically and/or physically associated with a command indicated entity.

In some embodiments, command engine 104 can find, determine, and/or provide one or more computing systems, CSs, and/or CSCs therein that meet command criteria and, optionally, can rate and/or rank the computing systems, CSs, and/or CSCs therein that meet the criteria based on one or more factors. For example, a user can trigger command engine 104 to "find five computing systems for performing service X" via a user interface. In this example, results obtained by command engine 104 can include the top five rated computing systems or related system identifiers that meet the requested criteria, where the computing systems can be rated using a performance indicator and/or a health indicator, such as a status indicator. In another example, a user can trigger command engine 104 to "find a storage component for storing streaming video" via a user interface. In this example, results obtained by command engine 104 can include the top rated storage component (e.g., under an operator's administration) that meets the requested criteria, where the rating is based on relevant factors, such as access speed of storage component, free space available at storage component, and/or utilization of storage component.

In some embodiments, command engine 104 can find, determine, and/or provide status information associated with one or more computing systems, CSs, and/or CSCs therein. For example, a user can trigger command engine 104 to "find any offline CS", "find status of all processing components in CS X", or "find all congested computing systems in Joy, TX" via a user interface. In this example, results obtained by command engine 104 can include relevant information associated with entities that meet the command criteria, including, for example, a performance indicator, a congestion indicator, and/or a health indicator, such as a status indicator or a usability indicator.

In some embodiments, command engine 104 or an entity therein can generate, store, and/or utilize result processing rules and/or other information for processing command related information (e.g., command results) obtained or gathered. For example, result processing rules associated with one or more data elements (e.g., JSON documents) or information therein (e.g., informational, categorical, and numerical fields) can be pre-defined in the system. In this example, one result processing rule can include performing an aggregation or summation of a particular field associated with a command result, e.g., by computing a minimum, an average, and/or a maximum of values of that field. In some embodiments, information obtained or derived using results processing rules can be incorporated into a final result set that can be provided to the user or another entity.

In some embodiments, command related information can be stored in repository 106. Repository 106 can include any data storage unit (e.g., a database or plurality of databases) that can be configured to store command related information, such as command instructions, command criteria, phrasing trees or related data structures, command generation rules, parsing rules, and/or historical information. Although FIG. 1 depicts repository 106 as a local data storage unit residing on CS 100, repository 106 can also be embodied as a data storage unit located at an online location (e.g., a public distributed content site), on a local proxy server in a customer's or system administrator's environment, or on a different CS without departing from the scope of the disclosed subject matter. Further, repository 106 can be implemented using one or more computing platforms, devices, or systems.

In some embodiments, repository 106 can be provisioned with command related information from a second repository (e.g., from a second CS or from an online location, such as a known, online site that can be hosted by the CS manufacturer). For example, command related information can be obtained or copied from a second repository (e.g., a second CS, an online site, online repository, or any other online location) over network 170, using secure copy (SCP) protocol, file transfer protocol (FTP), secure file transfer protocol (SFTP), hypertext transfer protocol (HTTP), or any like protocol. In some embodiments, CS 100 and a second CS can be located at a common site and can be communicatively connected by a wired connection. In such a configuration, repository 106 can be provisioned with command related information from the second CS via the wired connection. It is understood that the provisioning of repository 106 with command related information using the example methods described above can be conducted via any automated or automatic manner. In addition, command related information copied from a second repository and installed into repository 106 can utilize any form of transportable mediums, such as a compact disc (CD), flash memory, a universal serial bus (USB) device, and the like.

Virtualized infrastructure 108 can comprise a virtualization environment configured to simulate components of a computing device, such as a processor, system memory, and a storage device, for executing one or more virtual machines (VMs) (e.g., VM 110, VM 112, and VM 114). Each of VM 110, VM 112, and VM 114 can be configured to perform various functions and/or services, such as web server functions or cloud application services, and can interact with various nodes, components, and/or users.

In some embodiments, virtualized infrastructure 108 can be associated with one or more virtual entities. Each virtual entity can comprise one or more CS or portions therein, e.g., CSCs from one or more CSs. In some embodiments, virtualization manager 116 can allow logical entities to be created, deleted, or modified using an API and/or a GUI. Virtualization manager 116 can be any suitable entity (e.g., software executing in a virtual machine) for managing aspects associated with virtualized infrastructure 108. In some embodiments, virtualization manager 116 can be configured for providing data management via one or more communications interfaces. For example, virtualization manager 116 can communicate with one or more third-party management tools using APIs.

Physical infrastructure 118 can comprise hardware resources 122, such as memory module(s) 124, processor(s) 125, network components 126-127, compute components 128-130, and one or more storage component(s) 132. Hardware resources 122 can be communicatively connected to various other CSCs in CS 100 and other entities. Hardware resources 122 can be configured for use by one or more virtual entities. In some embodiments, network components 126-127 (e.g., network switches) can be configured to enable communication between the components in CS 100. In some embodiments, one or more file share storage (FSS) systems (not shown) can be utilized to provide file system level access to a CS across a local area network (LAN).

Hardware resource manager 120 can be any suitable entity (e.g., software executing in a virtual machine) for managing aspects associated with physical infrastructure 118. In some embodiments, hardware resource manager 120 can be configured to provision hardware resources 122 via one or more communications interfaces. For example, hardware resource manager 120 can provision hardware resources 122 for implementing one or more virtual entities in virtualized infrastructure 108. In some embodiments, hardware resource manager 120 can comprise any management component or entity, such as a unified infrastructure manager (UIM) or a computing system manager entity, (e.g., a Unified Computing System (UCS) Manager from Cisco Systems), which is configured to provision the physical hardware of CS 100.

In some embodiments, processor(s) 125 can include one or more physical processors, graphical processing units (GPUs), field-programmable gateway arrays (FPGAs), application-specific integrated circuits (ASICs), single-core processors, and/or multi-core processors. In some embodiments, processor(s) 125 can include a microprocessor (e.g., a trusted platform module (TPM) using trusted execution technology (TXT)), central processing unit (CPU), or any other like hardware based processing unit. In some embodiments, some aspects of the disclosed subject matter can be stored in memory module(s) 124, which can include random access memory (RAM), read only memory (ROM), optical read/write memory, cache memory, magnetic read/write memory, flash memory, or any other non-transitory computer readable medium. In some embodiments, processor(s) 125 and memory module(s) 124 can be used to execute, implement, and/or manage the operation of some aspects of the disclosed subject matter. In some embodiments, storage component(s) 132 can include any storage medium or storage unit that is configured to store information accessible by processor(s) 125 via a system bus. In some embodiments, repository 106 or portions thereof can utilize storage component(s) 132 and/or memory module(s) 124. In some embodiments, repository 106 and/or storage component(s) 132 can include or utilize one or more storage area networks.

As indicated above, the subject matter disclosed herein can be implemented in software in combination with hardware and/or firmware. For example, subject matter described herein can be implemented in software executed by a processor. In some example implementations, the subject matter described herein can be implemented using a computer readable medium having stored thereon computer executable instructions, which when executed by a processor of a computer, cause the computer to perform steps. Example computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms. For example, a command engine 104 or repository 106 (e.g., a system library or data therein) can be located at a single computing system or can be distributed across one or more devices, platforms, and/or systems. As used in the disclosed subject matter, the terms "function" or "module" refer to hardware, firmware, or software in combination with hardware and/or firmware for implementing features described herein.

In some embodiments, various entities depicted in FIG. 1 can be incorporated or implemented using one or more other entities depicted in FIG. 1. For example, memory module(s) 124 and/or processor(s) 125 can be incorporated in compute component 128, compute component 130, and/or a specialized device or compute component (e.g., an application management pod (AMP)). In another example, CS manager 102 can be implemented using or located in an AMP and/or another device in physical infrastructure 118. In yet another example, virtualization software and/or virtualized components can be implemented using an AMP and/or another compute device (e.g., a blade appliance designated for some system management software).

It will be appreciated that FIG. 1 is for illustrative purposes and that various components, their locations, and/or their functions as described above in relation to FIG. 1 can be changed, altered, added, or removed. For example, command engine 104 can comprise multiple, interacting processing engines, e.g., one engine for UI interaction, one engine for parsing, one engine for unstructured data set retrieval and management, and one engine for graph related data structure retrieval and management. Further, aspects of the disclosed subject matter (e.g., command engine 104) can be implemented and/or located on any computing system or components therein.

Figure 2:
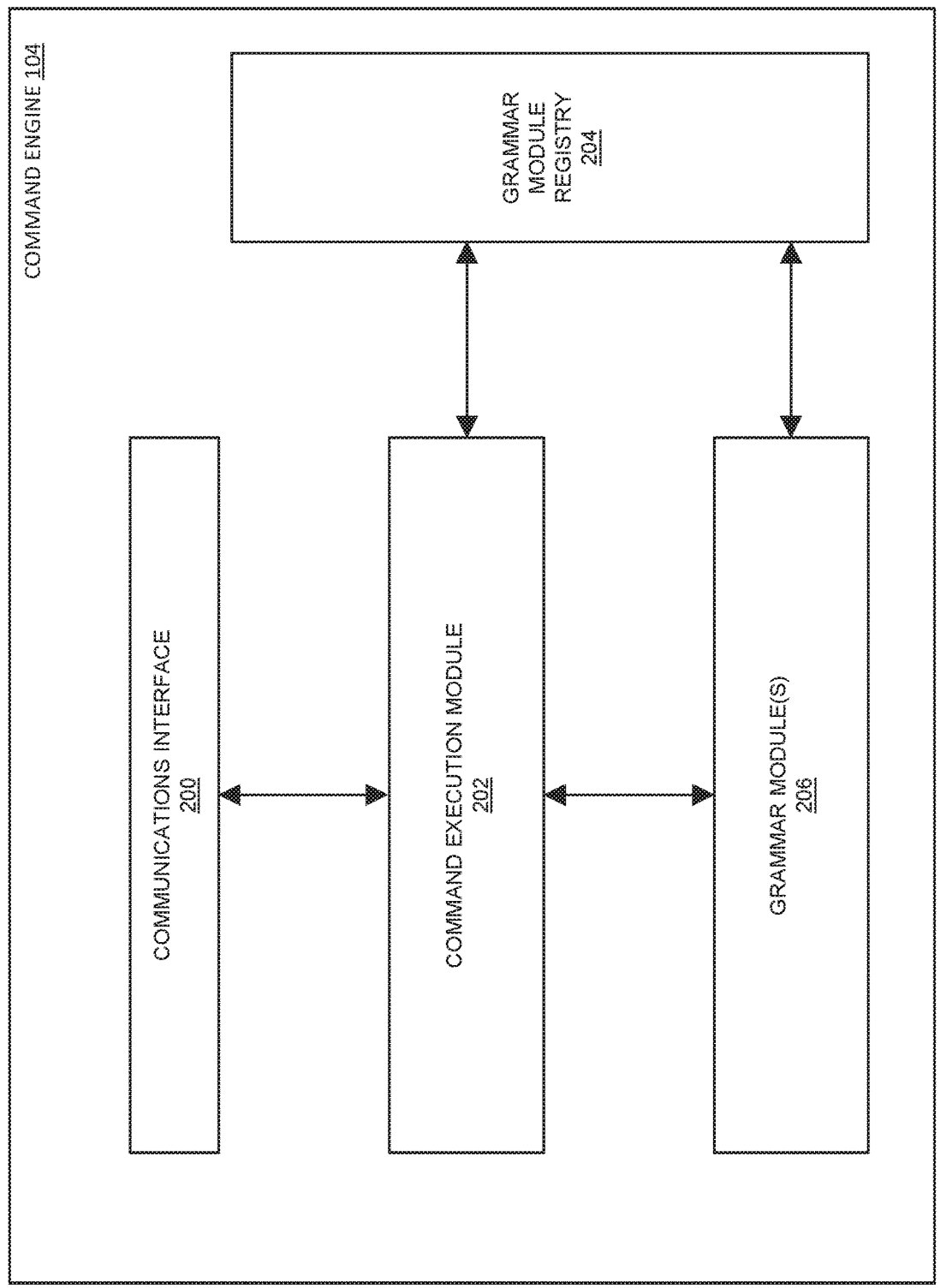
FIG. 2 is a diagram illustrating an example command engine.

FIG. 2 is a diagram illustrating an example command engine 104. In some embodiments, command engine 104 can be integrated with and/or can be located at CS manager 102, e.g., server-side software executing on a processor at CS 100. In some embodiments, command engine 104 can be integrated with and/or can be located at client 160, e.g., client-side software executing on a processor at client 160.

Referring to FIG. 2, command engine 104 can include communications interface 200, command execution module 202, grammar module registry 204, and grammar module(s) 206. Communications interface 200 can represent any suitable entity or entities (e.g., one or more network interface cards or portions thereof) for communicating with various entities. For example, communications interface 200 can receive communications from client 160 via one or more physical or virtual ports, communications interfaces, or connections. In some embodiments, communications interface 200 can include a GUI, a CLI, an API, or other interface for receiving and sending messages between various entities and/or modules. For example, communications interface 200 can include a representation state transfer (REST) API for receiving client-generated free-form commands and for sending command results to client 160.

In some embodiments, communications interface 200 and/or a messaging mechanism (e.g., a switching fabric or an internal message bus) can be usable for sending or receiving communications between command execution module 202, grammar module registry 204, and/or grammar module(s) 206. For example, an advanced message queuing protocol (AMQP) message bus can be usable for communications involving command execution module 202, grammar module registry 204, and/or grammar module(s) 206.

Command execution module 202 can include any suitable entity or entities (e.g., an ASIC, an FPGA, a programmable logic device (PLD), and/or software executing on one or more processor) for performing one or more aspects associated with command execution. For example, command execution module 202 can receive, via communication interface 200 or another communications interface, a free-form command from client 160. In this example, command execution module 202 can analyze and/or parse the free-form command into one or more commands that are capable of interacting with (e.g., modifying and/or querying) various data sets containing information about CS 100. Continuing with this example, command execution module 202 can perform the one or more queries, correlate returned results, and/or provide the results to client 160 via communications interface 200.

In some embodiments, command execution module 202 can include functionality for utilizing a predefined syntax with supported grammar. For example, a predefined syntax can recognize or support a number of action words or verbs, such as 'Find', 'Search', 'Determine', or 'Order'. In this example, the default syntax can also recognize various modifiers associated with various supported action words or verbs, such as certain data types, parameters, values, or identifiers. Continuing with this example, if command execution module 202 identifies unsupported grammar in a free-form command, command execution module 202 can query grammar module registry 204 for information to communicate with one or more grammar modules 206 which can extend the predefined syntax and/or support additional grammar.

Grammar module registry 204 can include any suitable entity or entities (e.g., an ASIC, an FPGA, a PLD, and/or software executing on one or more processor) for storing registry information about grammar module(s) 206. Registry information can include grammar module information (e.g., grammar module identifiers, module usage criteria, and/or network address information) and/or any other information usable for identifying and/or determining appropriate grammar modules for handling certain grammar, data types, or queries. In some embodiments, grammar registry module 204 can receive registry information in registration messages from various grammar module(s) 206.

In some embodiments, grammar module registry 204 can provide grammar module information to command execution module 202. For example, command execution module 202 can send, via communication interface 200 or an AMQP message bus, a request for grammar module information to grammar module registry 204. In this example, the request message can include at least a portion of a free-form command which can be usable by grammar module registry 204 for identifying grammar module(s) 206 that supports syntax or grammar in the free-form command. Continuing with this example, grammar module registry 204 can provide an endpoint identifier, such as a REST uniform resource locator (URL), a message bus identifier, or an IP address) or other information for communicating with grammar module(s) 206 that supports syntax or grammar in the free-form command.

Grammar module(s) 206 can include any suitable entity or entities (e.g., an ASIC, an FPGA, a PLD, and/or software executing on one or more processor) for performing aspects associated with command processing and/or grammar processing. For example, one or more of grammar module(s) 206 can represent software and/or logic that can be utilized or plugged-in at run-time (e.g., pluggable). In another example, one or more of grammar module(s) 206 can represent software and/or logic that can be utilized or configured at initialization (e.g., non-pluggable). Grammar module(s) 206 can extend syntax and/or grammar used in processing and/or in converting free-form commands into machine readable commands and/or queries. In some embodiments, each of grammar module(s) 206 can register, via Consul or another registration mechanism, grammar module information with grammar module registry 204 such that appropriate grammar module(s) 206 can be identified (e.g., those that support needed syntax and/or grammar extensions for particular free-form commands).

In some embodiments, grammar module(s) 206 may include functionality similar to grammar module registry 204. For example, command execution module 202 can send, via communication interface 200 or an AMQP message bus, a request for grammar related information to one or more grammar module(s) 206. In this example, the request message can include at least a portion of a free-form command which can be usable by each of grammar module(s) 206 for determining whether it can support syntax or grammar in the free-form command. Continuing with this example, if a particular grammar module determines that it can support syntax or grammar in the free-form command, the grammar module may respond to the request and/or otherwise indicate to command execution module 202 its capability and/or availability for supporting syntax or grammar in the free-form command.

It will be appreciated that FIG. 2 is for illustrative purposes and that various components, their locations, and/or their functions as described above in relation to FIG. 2 can be changed, altered, added, or removed. Further, aspects of the disclosed subject matter (e.g., command engine 104) can be implemented and/or located on any computing system or components therein.

FIG. 3 is a diagram illustrating example grammar module registry data 300. Registry data 300 can represent any grammar module information, such as identifiers, address information, and usage criteria associated with grammar modules(s) 206, and can be stored or maintain by grammar module registry 204. In some embodiments, registry data 300 can be accessible to command engine 104, command execution module 202, and/or other entities, e.g., CS 100 or CS manager 102. For example, registry data 300 can be store in repository 106 or another memory.

Examples of registry data 300 can include verbs for indicating supported actions (e.g., 'set' or 'rename'), parameters for indicating required objects or values of actions (e.g., 'IP address' or 'VLAN ID'), predicates for indicating whether actions can be performed (e.g., 'SCORE >75' or 'IP ADDRESS VALUE IS BETWEEN 192.178.10.05 AND 192.178.10.140'), usage filters for indicating one or more conditions for when and/or whether a grammar module is usable (e.g., a particular operating system or firmware version number), and endpoint identifiers for communicating with grammar module(s) 206 (e.g., a REST URL, a message bus address, or SOAP information).

In some embodiments, registry data 300 can be provided to grammar module registry 204 during registration of one or more grammar modules 206. For example, each of grammar modules 206 can send a registration message to grammar module registry 204. In this example, each registration message can include information such that grammar module registry 204 can identify whether a particular grammar module 206 is suitable for handling or supporting a particular free-form command or portion thereof and, if so, can provide information to a requesting entity for interacting with or utilizing the particular grammar module 206.

Referring to FIG. 3, registry data 300 can include information about module identifiers, supported verb(s), required parameter(s), supported predicate(s), usage filter(s), and/or endpoint identifier(s). For example, a table representing registry data 300 can comprise columns and/or fields for a module identifier, supported verb(s), required parameter(s), supported predicate(s), usage filter(s), and/or endpoint identifier(s).

A module identifier field value can comprise a module name, a value, and/or an identifier, such as 'NET_12' or 'DB_234', indicating one of grammar module(s) 206 usable for supporting one or more syntax and/or grammar extensions associated with processing (e.g., parsing) free-form commands. For example, a module identifier field value can include a unique identifier for indicating one of grammar module(s) 206.

A supported verb(s) field value can comprise one or more phrases, words, values, and/or other information indicating one or more syntax and/or grammar extensions associated with free-form commands, such as 'SET', 'REVERT', 'ADD', 'DELETE', or 'CHANGE'. For example, a supported verb(s) field value can be used in determining an appropriate grammar module 206 for a particular free-form command. In this example, grammar module registry 204 can check whether any unsupported words or values (e.g., 'SET') in a free-form command (e.g., 'SET IP ADDRESS of ELEMENT X to 192.178.10.34') match any supported verbs in registry data 300 associated with a particular grammar module and, if so, grammar module registry 204 can determine whether all other conditions associated with the particular grammar module are satisfied before determining that the particular grammar module is appropriate for supporting the free-form command or a portion thereof.

A required parameter(s) field value can comprise a null value (e.g., 'N/A' value) or can include one or more parameters, values, objects, and/or other information indicating an object or a value needed for a verb or a related action, e.g., 'AP ADDRESS', 'PORT NUMBER', 'MAC ADDRESS', 'URL', 'VLAN ID', OR 'SERIAL NUMBER'. For example, a required parameter(s) field value can be used in determining an appropriate grammar module 206. In this example, after identifying a particular grammar module that supports a particular verb (e.g., 'SET') in a free-form command (e.g., 'SET IP ADDRESS of ELEMENT X to 192.178.10.34'), grammar module registry 204 can check whether a required parameter (e.g., 'IP ADDRESS') associated with the particular grammar module is also in the free-form command (e.g., as indicated by a grammar module information request message sent by command execution module 202) and, if so, grammar module registry 204 can determine whether all other conditions associated with the particular grammar module are satisfied before determining that the particular grammar module is appropriate, e.g., cable of supporting the free-form command.

A supported predicate(s) field value can comprise a null value (e.g., 'N/A' value) or can comprise one or more expressions, values, and/or other information indicating one or more conditions that need to be satisfied before supporting a verb or a related action, such as 'SCORE >75' or 'IP ADDRESS VALUE IS BETWEEN 192.178.10.05 AND 192.178.10.140'. For example, a supported predicate(s) field value can be used in determining an appropriate grammar module 206. In this example, after identifying a particular grammar module that supports a particular verb (e.g., 'SET') in a free-form command (e.g., 'SET IP ADDRESS of ELEMENT X to 192.178.10.34') and after determining that the free-form command includes associated required parameters (e.g., 'IP ADDRESS'), grammar module registry 204 can check whether all predicates (e.g., 'IP ADDRESS VALUE IS BETWEEN 192.178.10.05 AND 192.178.10.140') associated with the grammar module are satisfied, and if all associated predicates are satisfied and if other conditions (e.g., usage filters) are satisfied, grammar module registry 204 can provide, to command execution module 202, a corresponding endpoint identifier for communicating with the grammar module.

A usage filter field value can comprise a null value (e.g., 'N/A' value) or can comprise one or more expressions, values, criteria, and/or other information indicating one or more conditions that need to be satisfied before one of grammar module(s) 206 can be used, such as 'OS TYPE=WINDOWS 10' or 'ELEMENT=X'. For example, a usage filter field value can be used in determining an appropriate grammar module 206. In some embodiments, grammar module registry 204 can filter registry data 300 based on usage filters and grammar module information requests. For example, instead of searching all of registry data 300, grammar module registry 204 can limit search to information of grammar modules 206 that satisfy related usage filters.

In some embodiments, usage filters can be checked after determining that grammar module(s) 206 may be appropriate. For example, after identifying a particular grammar module that supports a particular verb (e.g., 'SET') in a free-form command (e.g., 'SET IP ADDRESS of ELEMENT X to 192.178.10.34'), and after determining that the free-form command includes associated required parameters (e.g., 'IP ADDRESS') and after determining that the free-form command meet all associated predicates (e.g., 'IP ADDRESS VALUE IS BETWEEN 192.178.10.05 AND 192.178.10.140'), grammar module registry 204 can check whether all usage filters for the grammar module is satisfied, and, if so, grammar module registry 204 can provide, to command execution module 202, a corresponding endpoint identifier for communicating with the grammar module(s) 206.

It will be appreciated that registry data 300 is illustrative and that additional and/or different information can be stored in grammar module registry 204.

Figure 4:
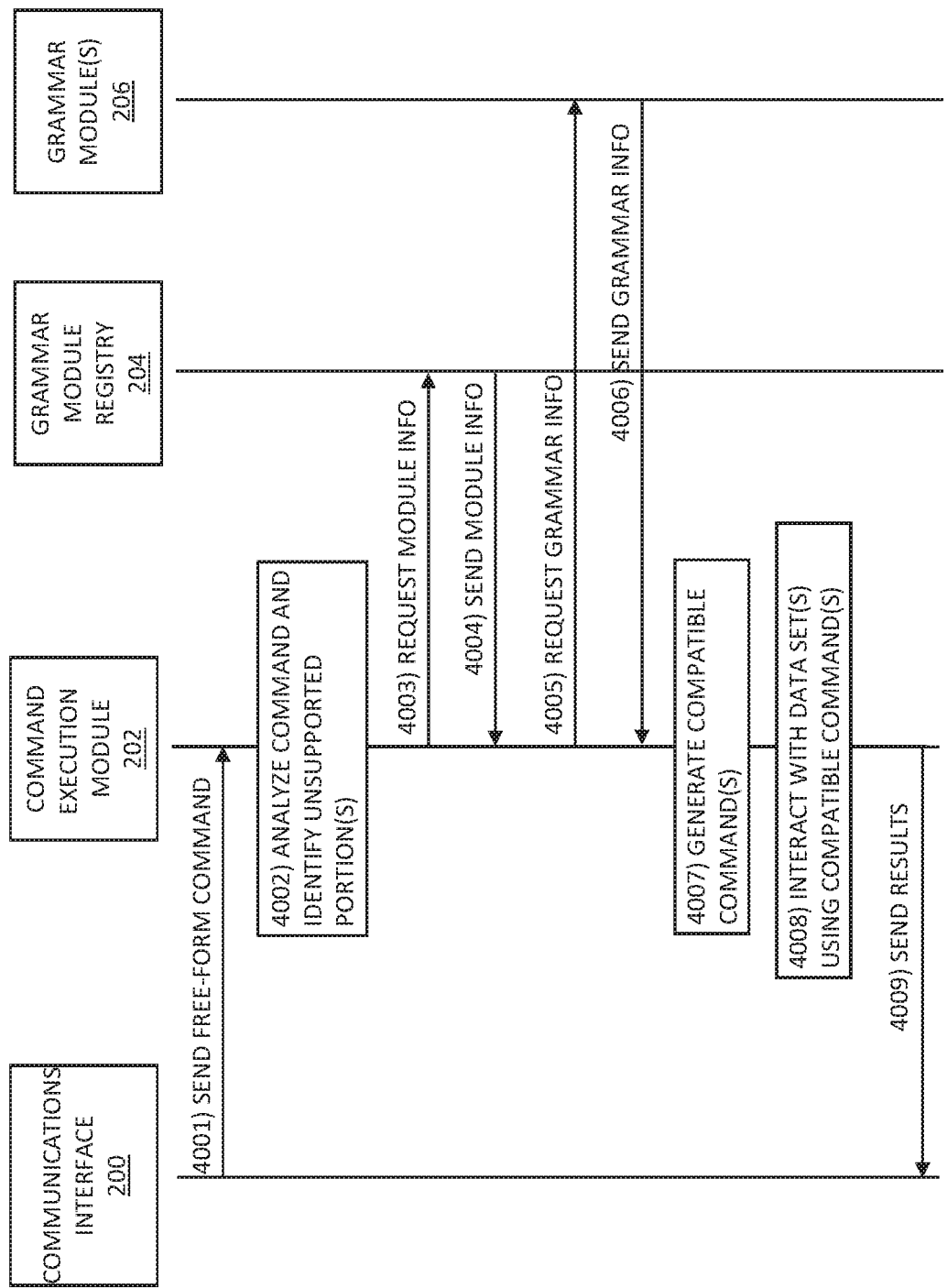
FIG. 4 is a diagram illustrating example communications associated with command engine execution involving a grammar module registry.

FIG. 4 is a diagram illustrating example communications associated with command engine execution involving grammar module registry 204. In some embodiments, client 160 via a user interface can send free-form commands to command engine 104 for modifying and/or obtaining various information about CS 100. In some embodiments, grammar module registry 204 may be consulted (e.g., via a request message or an API call) by command engine 104 to identify one or more appropriate grammar module(s) 206 for supporting at least some of the grammar in received free-form commands. For example, by using appropriate grammar module(s) 206, command engine 104 can receive free-form commands, analyze and/or process the commands to generate compatible commands usable for interacting with one or more data sets containing information about CS 100, correlate the obtained information, and provide the correlated information back to client 160.

Referring to FIG. 4, in step 4001, a free-form command can be sent from communications interface 200 to command execution module 202. For example, a user can input a natural language command via a user interface at client 160. In this example, a user interface and/or a related application or entity can send the natural language command via an HTTP message or other message.

In step 4002, command execution module 202 can analyze the free-form command and identify any unsupported portions. For example, command execution module 202 can analyze a free-form command and, if some portions (e.g., verbs, words, modifiers, values, etc.) of the free-form command are unsupported, grammar module registry 204 can be queried for grammar module(s) 206 that can support these portions.

In step 4003, command execution module 202 can request grammar module information from grammar module registry 204. For example, command execution module 202 can send a request message for information usable to communicate and/or utilize grammar module(s) 206. In this example, the request message can include at least a portion of a free-form command which can be used (e.g., by grammar module registry 204) to identify appropriate grammar module(s) 206.

In step 4004, grammar module registry 204 can send grammar module information to command execution module 202. For example, grammar module registry 204 can send a response message that includes one or more endpoint identifiers, such as an IP addresses and/or port numbers, for communicating with grammar module(s) 206.

In step 4005, command execution module 202 can request grammar processing for at least a portion of the free-form command from grammar module(s) 206. For example, command execution module 202 can send a request message for grammar processing to grammar module(s) 206. In this example, the request message can include at least a portion of a free-form command which can be usable by grammar module(s) 206 for parsing.

In step 4006, grammar module(s) 206 can send grammar parsing related information to command execution module 202. For example, after performing grammar processing for a free-form command or portion thereof, grammar module(s) 206 can send a response message that includes a data structure (e.g., a phrasing tree or an AST), a command portion for a data set specific command, or other information usable by command execution module 202 for parsing and/or processing the free-form command.

In step 4007, command execution module 202 can generate one or more compatible commands for querying or modifying (e.g., provisioning) information associated with CS 100. For example, using grammar module(s) 206 and/or information obtained from grammar module(s) 206, command execution module 202 can generate one or more commands based on a free-form command for obtaining or modifying information about CS 100 from one or more data sets. In this example, the generated commands can also utilize results from prior commands or sub-commands, e.g., a subsequent query can be configured for querying a data set that is based on results returned from a previous related query.

In step 4008, one or more data sets can be interacted with using the one or more compatible commands. For example, after generating a phrasing tree using grammar module(s) 206, command execution module 202 can generate a SQL query using the phrasing tree. In this example, command execution module 202 can use the SQL query for obtaining information stored in a SQL-related database. In another example, graph related data can be queried and/or used. For example, command execution module 202 can use a graph database (e.g., a Titan database) for identifying a first data element associated with a free-form command. In this example, command execution module 202 can use the graph database for obtaining contextually relevant information associated with the query by identifying and/or traversing adjacent data elements and/or edges associated with the first data element.

In some embodiments, command execution module 202 can process (e.g., correlate and aggregate) various information obtained from one or more data sets and/or graph related data. For example, command execution module 202 can aggregate values for a particular field by computing a minimum, an average, and/or a maximum of the values of the field. In this example, the aggregated value can be provided to the user along with other command related information (e.g., command results). In another example, command execution module 202 can aggregate values for a particular field using time value information (e.g., information that varies over time).

In some embodiments, command execution module 202 can generate a sequence of commands that act as a processing pipeline for obtaining or modifying relevant information from different, heterogeneous data sets, e.g., involving different CSCs and/or communications protocols or retrieval syntax. For example, each command in a sequence of commands can return a data set of information from one or more databases, where a subsequent command in the sequence of command can query, modify, or filter the returned data set and obtain a subset of the data set.

In step 4009, command results can be sent from command execution module 202 to communications interface 200. For example, command results can be sent in an HTTP message or other message to client 160 via communications interface 200 and displayed using a user interface and/or a web browser application.

It will be appreciated that FIG. 4 is for illustrative purposes and that additional and/or different steps than those depicted in FIG. 4 can be usable for command engine execution. Additionally, it will be appreciated that steps depicted in FIG. 4 can occur in a different order than depicted or can be combined.

Figure 5:
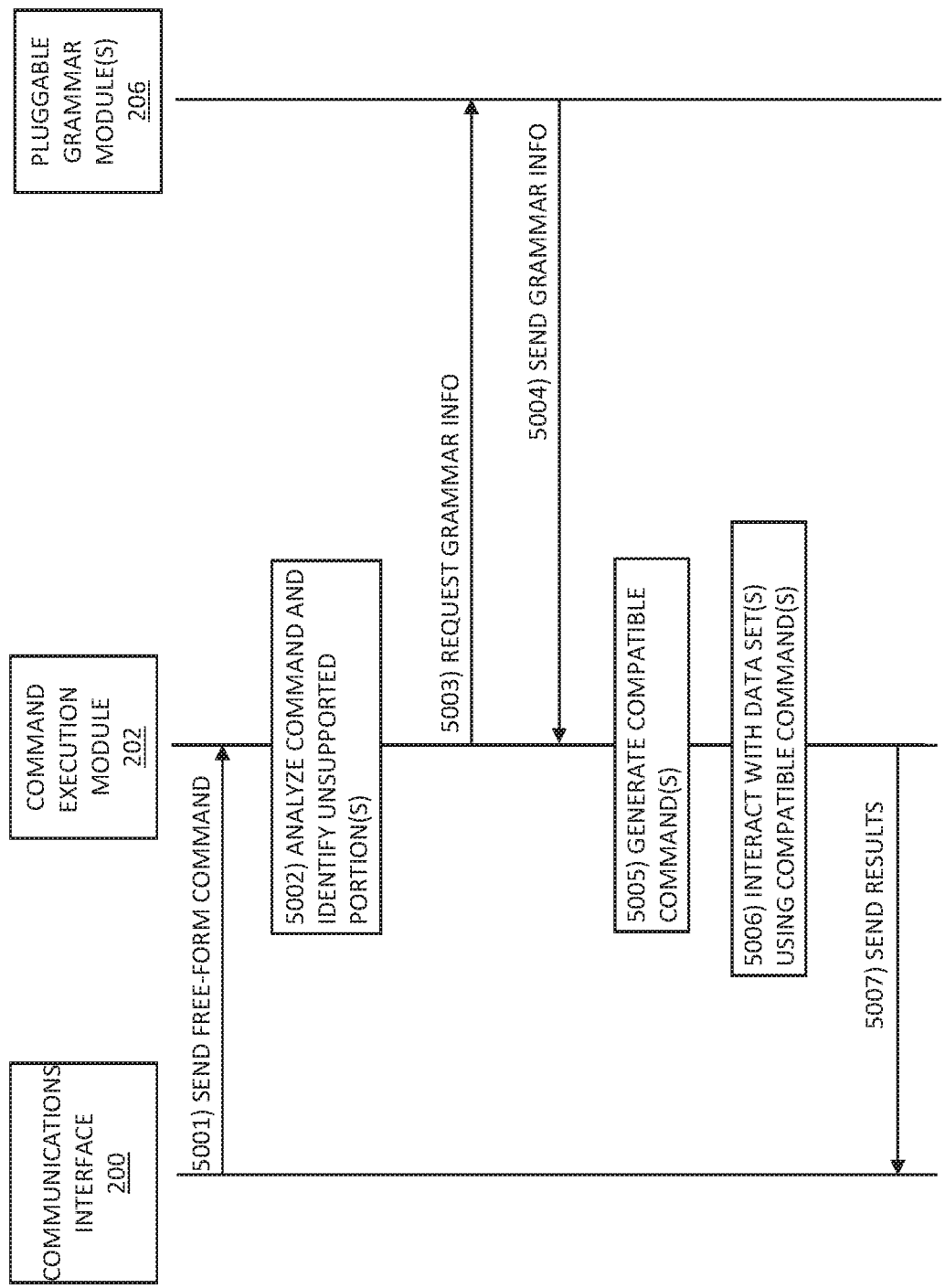
FIG. 5 is a diagram illustrating example communications associated with command engine execution.

FIG. 5 is a diagram illustrating example communications associated with command engine execution involving grammar module registry 204. In some embodiments, client 160 via a user interface can send free-form commands to command engine 104 for modifying and/or obtaining various information about CS 100. In some embodiments, command engine 104 may broadcast or otherwise communicate (e.g., without consulting or using a separate grammar module registry 204) free-form related information to grammar module(s) 206. In such embodiments, grammar module(s) 206 capable of supporting at least some of the grammar in received free-form commands may be configured to respond with grammar related information or otherwise indicate their capability to command engine 104. For example, by using appropriate grammar module(s) 206, command engine 104 can receive free-form commands, analyze and/or process the commands to generate compatible commands usable for interacting with one or more data sets containing information about CS 100, correlate the obtained information, and provide the correlated information back to client 160.

Referring to FIG. 5, in step 5001, a free-form command can be sent from communications interface 200 to command execution module 202. For example, a user can input a natural language command via a user interface at client 160. In this example, a user interface and/or a related application or entity can send the natural language command via an HTTP message or other message.

In step 5002, command execution module 202 can analyze the free-form command and identify any unsupported portions. For example, command execution module 202 can analyze a free-form command and, if some portions (e.g., verbs, words, modifiers, values, etc.) of the free-form command are unsupported, grammar module registry 204 can be queried for grammar module(s) 206 that can support these portions.

In step 5003, command execution module 202 can request grammar processing for at least a portion of the free-form command from grammar module(s) 206. For example, command execution module 202 can send a request message for grammar processing to a group of grammar modules 206. In this example, the request message can include at least a portion of a free-form command which can be usable by grammar module(s) 206 for parsing.

In some embodiments, command execution module 202 may send a request for grammar processing assistance via a broadcast or multicast address, via known endpoint identifiers, or via another technique. For example, when processing a free-form command, command execution module 202 may send the request to a group of grammar modules 206, where each of grammar modules 206 are configured to respond if available and/or capable of processing at least a portion of the free-form command. In this example, since grammar module(s) 206 can identify themselves as capable to assist command engine 104 in processing the free-form command, grammar module registry 204 may be unused and/or unneeded for identifying appropriate grammar module(s) 206.

In step 5004, one or more appropriate grammar module(s) 206 can determine that they are capable of supporting at least a portion of the free-form command and, in response, may send grammar parsing related information to command execution module 202. For example, after analyzing free-form information in a request and/or performing related grammar processing, grammar module(s) 206 can send a response message that includes a data structure (e.g., a phrasing tree or an AST), a command portion for a data set specific command, or other information usable by command execution module 202 for parsing and/or processing the free-form command.

In step 5005, command execution module 202 can generate one or more compatible commands for querying or modifying (e.g., provisioning) information associated with CS 100. For example, using grammar module(s) 206 and/or information obtained from grammar module(s) 206, command execution module 202 can generate one or more commands based on a free-form command for obtaining or modifying information about CS 100 from one or more data sets. In this example, the generated commands can also utilize results from prior commands or sub-commands, e.g., a subsequent query can be configured for querying a data set that is based on results returned from a previous related query.

In step 5006, one or more data sets can be interacted with using the one or more compatible commands. For example, after generating a phrasing tree using grammar module(s) 206, command execution module 202 can generate a SNMP command using the phrasing tree. In this example, command execution module 202 can use the SNMP command for obtaining or modifying information stored in a SNMP-related database. In another example, graph related data can be queried and/or used. For example, command execution module 202 can use a graph database (e.g., a Titan database) for identifying a first data element associated with a free-form command. In this example, command execution module 202 can use the graph database for obtaining or modifying contextually relevant information associated with the command by identifying and/or traversing adjacent data elements and/or edges associated with the first data element.

In some embodiments, command execution module 202 can process (e.g., correlate and aggregate) various information obtained from one or more data sets and/or graph related data. For example, command execution module 202 can aggregate values for a particular field by computing a minimum, an average, and/or a maximum of the values of the field. In this example, the aggregated value can be provided to the user along with other command related information (e.g., command results). In another example, command execution module 202 can aggregate values for a particular field using time value information (e.g., information that varies over time).

In some embodiments, command execution module 202 can generate a sequence of commands that act as a processing pipeline for obtaining or modifying relevant information from different, heterogeneous data sets, e.g., involving different CSCs and/or communications protocols or retrieval syntax. For example, each command in a sequence of commands can return a data set of information from one or more databases, where a subsequent command in the sequence of command can query, modify, or filter the returned data set and obtain a subset of the data set.

In step 5007, command results can be sent from command execution module 202 to communications interface 200. For example, command results can be sent in an HTTP message or other message to client 160 via communications interface 200 and displayed using a user interface and/or a web browser application.

It will be appreciated that FIG. 5 is for illustrative purposes and that additional and/or different steps than those depicted in FIG. 5 can be usable for command engine execution. Additionally, it will be appreciated that steps depicted in FIG. 5 can occur in a different order than depicted or can be combined.

Figure 6:
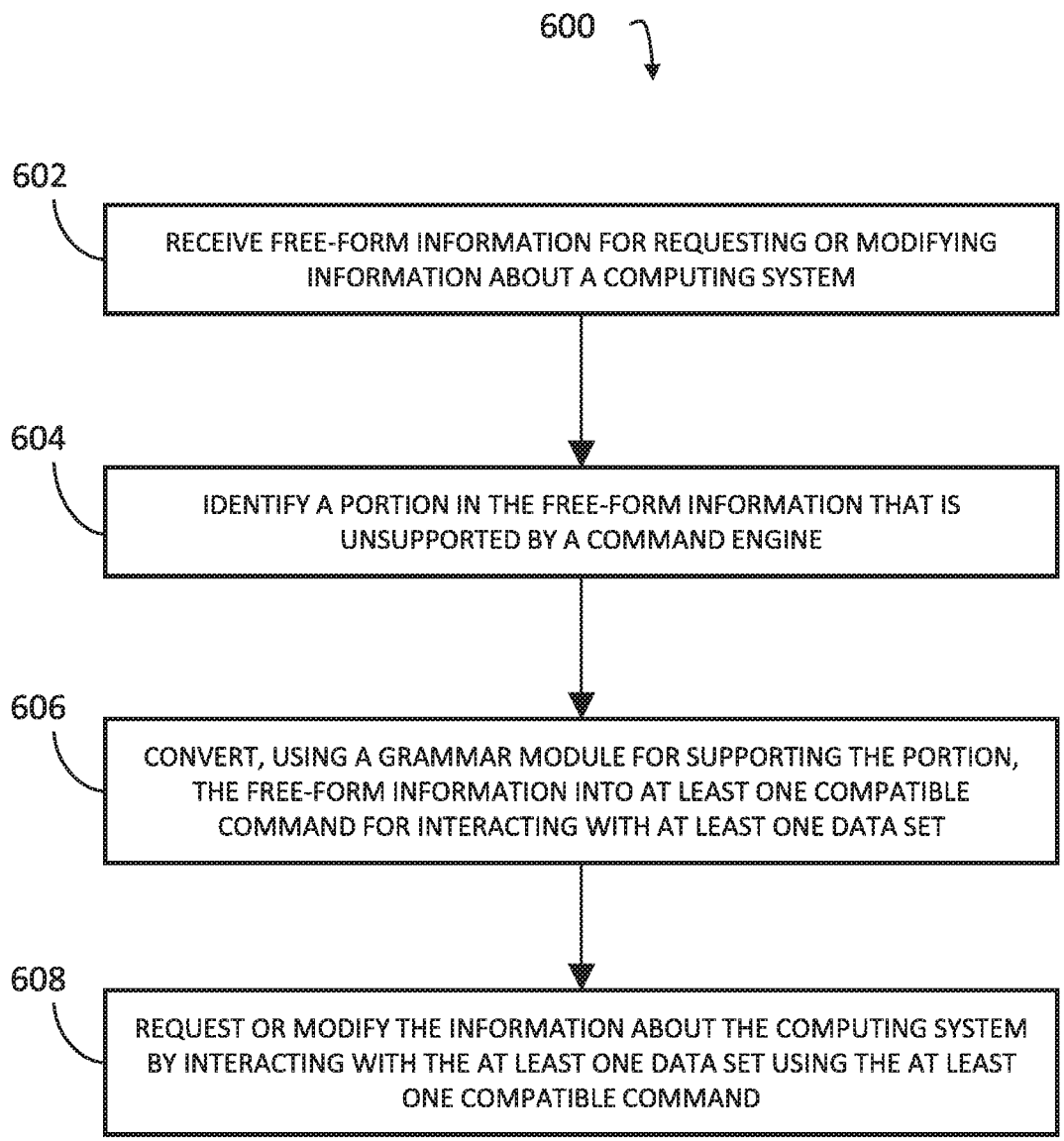
FIG. 6 is a diagram illustrating an example method for command engine execution.

FIG. 6 is a diagram illustrating an example method 600 for command engine execution. In some embodiments, example method 600 and/or portions therein can be performed by CS 100, command engine 104, command execution module 202, and/or another node (e.g., a computing platform containing one or more processors and memory) or module. For illustrative purposes and explanation, references to entities included in FIGS. 1-5 may be used below.

In step 602, free-form information for requesting or modifying information about CS 100 is received. For example, free-form information can be a single, self-standing command string and/or can be stored in a command message. In another example, free form information can be stored as in an XML file or other file. In some embodiments, free-form information can include a natural language or semi-natural language command or query.

In step 604, a portion in the free-form information is identified as unsupported by command engine 104. For example, a free-form command can include the phrase "Set IP address of device 'X' to 192.175.2.4". In this example, the word "Set" can be unsupported by the default or predefined syntax used by command engine 104.

In step 606, the free-form information is converted into at least one compatible command for interacting with at least one data set using a grammar module that supports the portion. For example, command engine 104 can convert free-form information (e.g., a natural language command) into a compatible (e.g., a data set native) query (e.g., an XML-based query or a SQL query) for querying a database or other data structure.

In some embodiments, prior to converting free-form information into at least one compatible command, information about a grammar module that can support a portion of a free-form command may be requested from grammar module registry 204 and an endpoint identifier for communicating with a grammar module may be received from grammar module registry 204. For example, command engine 104 or a related entity (e.g., command execution module 202) can send a grammar module information request or other message that includes a free-form command or other information usable to determine whether grammar module registry 204 has an appropriate grammar module that can support (e.g., parse) the command or a portion thereof. In this example, grammar module registry 204 can send a grammar module response or other message that includes an IP address and port number for communicating with the appropriate grammar module.

In some embodiments, requesting, from grammar module registry 204, information about a grammar module for supporting a portion can include sending at least some of the free-form information to grammar module registry 204, determining whether a grammar module supports the portion, in response to determining that the grammar module supports the portion, determining whether usage requirements for utilizing the grammar module are satisfied, and in response to determining that the usage requirements are satisfied, sending the endpoint identifier for communicating with the grammar module that supports the portion and meets the usage requirements.

In some embodiments, prior to converting free-form information into at least one compatible command, free-form information may be sent to one or more grammar modules for requesting assistance with processing the free-form information and may receive a response from the grammar module that supports the portion. For example, a group of grammar modules 206 may receive grammar processing requests via a communications bus or a broadcast/multicast network address. In this example, each of grammar modules 206 may be programmed and/or configured to respond to a request and/or may indicate whether it can assist in processing at least some free-form information.

In some embodiments, converting free-form information into at least one compatible command can include sending, to a grammar module, at least a portion (e.g., an unsupported portion) of the free-form information and receiving, from the grammar module, a valid portion of the at least one compatible command.

In some embodiments, converting free-form information into at least one compatible command can include generating a sequence of commands, wherein at least one command in the sequence of commands is configured to use results from a previous command in the sequence of commands. For example, command engine 104 or module(s) therein (e.g., command execution module 202) can parse a free-form command into stages of a processing pipeline, where each stage can identify a (e.g., narrowed) data set. In this example, command engine 104 or module(s) therein can generate queries or actions based on one or more command-obtained data sets. Continuing with this example, at least one generated command can use results (e.g., a list of CSCs meeting some command criteria) of a prior stage or command when executing one or more subsequent commands or related actions.

In some embodiments, command engine 104 or a related entity (e.g., a parser) can generate a compatible command (e.g., an SQL query) using a phrasing tree, grammar module(s) 206, and/or one or more command generation rules associated with the at least one data set. For example, converting free-form information into at least one compatible command can include generating (e.g., using a parser or command engine 104) a data structure (e.g., an AST or a phrasing tree) for representing the free-form information and generating, using the data structure, the at least one compatible command that is understandable by a data management system managing at least one data set.

In step 608, the at least one data set is interacted with using the at least one compatible command. For example, command engine 104 can retrieve and/or modify data in a management information base (MIB) associated with one or more CSCs in CS 100 using free-form information (e.g., a natural language command) that has been converted or formatted to be compatible with interacting with the MIB.

In some embodiments, querying, using free-form information, at least one data set for the information about CS 100 can include utilizing a graph related data structure for obtaining at least one member selected from a group consisting of the information about the CS and contextually relevant information associated with the information about the CS.

In some embodiments, contextually relevant information can include statistics based on queried information, a maximum of a set of values, a minimum of a set of values, an average of a set of values, an aggregation of a set of values, a derived value using information from one or more sources, time value information (e.g., information that varies over time), and/or information stored in at least one adjacent element to an element storing the information about the computing system in the graph related data structure.

In some embodiments, at least one data set and a graph related data structure can be associated with one or more data management systems. For example, an element management system (EMS) can manage a database for one or more CSCs associated with CS 100 and CS manager 102 can manage a graph related data structure (e.g., a graph database) and one or more data sets containing information about CS 100 or CSCs therein.

In some embodiments, information about CS 100 can include information about a computing platform, a computing device, a converged infrastructure system, a virtual machine, a hypervisor, a compute component, a network component, a storage component, software, an operating system, firmware, hardware, a physical resource, and/or a virtual resource.

In some embodiments, a grammar module can register with grammar module registry 204 prior to receiving free-form information. For example, some of grammar module(s) 206 can register with grammar module registry 204 at initialization and some of grammar module(s) 206 can register with grammar module registry 204 at after initialization (e.g., during run-time).

In some embodiments, grammar module(s) 206 can register with grammar module registry 204 by registering a portion (e.g., one or more verbs, words, phrases, and/or values) that is supported by grammar module(s) 206, a required parameter indicating an object or a value needed for supporting the portion, a predicate indicating a condition to be satisfied before supporting the portion, a filter indicating whether grammar module(s) 206 can be usable, or an endpoint identifier for communicating with grammar module(s) 206.

In some embodiments, an endpoint identifier can include an Internet protocol (IP) address, a message bus identifier, a port number, a uniform resource locator, a SOAP identifier, or a remote procedure call (RPC) identifier.

It should be noted that command engine 104 and/or functionality described herein can constitute a special purpose computing system. Further, command engine 104 and/or functionality described herein can improve the technological field of command engines (e.g., command engines involving diverse data sets managed by multiple entities) by utilizing a grammar module registry for communicating with grammar modules to extend and/or enhance syntax and/or grammar of free-form (e.g., natural language) commands usable for obtaining and/or modifying information about one or more computing systems and/or CSCs therein.

It will be understood that various details of the subject matter described herein can be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for command engine execution, the method comprising:
receiving free-form information for requesting or modifying information about a computing system;
identifying a portion in the free-form information that is unsupported by a command engine;
sending, via a broadcast or multicast network address, at least some of the free-form information to two or more grammar modules for requesting assistance with processing the portion, wherein each of the two or more grammar modules is configured to receive requests for assistance sent to the broadcast or multicast network address and to respond to the requests that it is capable of supporting;

receiving a response from the grammar module that supports the portion;

converting, using the grammar module that supports the portion, the free-form information into at least one compatible command for interacting with at least one data set; and requesting or modifying the information about the computing system by interacting with the at least one data set using the at least one compatible command.

2. The method of claim 1 wherein converting, using the grammar module that supports the portion, the free-form information into the at least one compatible command comprises generating a sequence of commands, wherein at least one command in the sequence of commands is configured to use results from a previous command in the sequence of commands.

3. The method of claim 1 comprising:

receiving second free-form information for requesting or modifying second information about the computing system;

identifying a second portion in the free-form information that is unsupported by the command engine;

requesting, from a grammar module registry, information about a second grammar module that supports the second portion; and receiving, from the grammar module registry, an endpoint identifier for communicating with the second grammar module.

4. The method of claim 3 wherein requesting, from a grammar module registry, information about the second grammar module that supports the second portion comprises:

sending at least some of the second free-form information to the grammar module registry;

determining whether the second grammar module supports the second portion;

in response to determining that the second grammar module supports the second portion, determining whether usage requirements for utilizing the second grammar module are satisfied; and in response to determining that the usage requirements are satisfied, sending the endpoint identifier for communicating with the second grammar module that supports the second portion and meets the usage requirements.

5. The method of claim 3 wherein the second grammar module registers with the grammar module registry by registering the second portion that is supported by the grammar module, a required parameter indicating an object or a value needed for supporting the second portion, a predicate indicating a condition to be satisfied before supporting the second portion, a filter indicating whether the second grammar module is usable, or the endpoint identifier for communicating with the second grammar module.

6. The method of claim 1 wherein converting, using the grammar module that supports the portion, the free-form information into the at least one compatible command comprises:

sending, to the grammar module, at least the portion of the free-form information; and receiving, from the grammar module, a valid portion of the at least one compatible command.

7. A system for command engine execution, the system comprising:

a processor; and a command engine implemented using the processor, wherein the command engine is configured for:

receiving free-form information for requesting or modifying information about a computing system;

identifying a portion in the free-form information that is unsupported by a command engine;

sending, via a broadcast or multicast network address, at least some of the free-form information to two or more grammar modules for requesting assistance with processing the portion, wherein each of the two or more grammar modules is configured to receive requests for assistance sent to the broadcast or multicast network address and to respond to the requests that it is capable of supporting;

receiving a response from the grammar module that supports the portion;

converting, using the grammar module that supports the portion, the free-form information into at least one compatible command for interacting with at least one data set; and requesting or modifying the information about the computing system by interacting with the at least one data set using the at least one compatible command.

8. The system of claim 7 wherein converting, using the grammar module, the free-form information into the at least one compatible command comprises generating a sequence of commands, wherein at least one command in the sequence of commands is configured to use results from a previous command in the sequence of commands.

9. The system of claim 7 wherein the command engine is further configured for:

receiving second free-form information for requesting or modifying second information about the computing system;

identifying a second portion in the free-form information that is unsupported by the command engine;

requesting, from a grammar module registry, information about a second grammar module that supports the second portion; and receiving, from the grammar module registry, an endpoint identifier for communicating with the second grammar module.

10. The system of claim 9 wherein the command engine is further configured for:

sending at least some of the second free-form information to the grammar module registry;

determining whether the second grammar module supports the second portion;

in response to determining that the second grammar module supports the second portion, determining whether usage requirements for utilizing the second grammar module are satisfied; and in response to determining that the usage requirements are satisfied, sending the endpoint identifier for communicating with the second grammar module that supports the second portion and meets the usage requirements.

11. The system of claim 9 wherein the second grammar module registers with the grammar module registry by registering the second portion that is supported by the grammar module, a required parameter indicating an object or a value needed for supporting the second portion, a predicate indicating a condition to be satisfied before supporting the second portion, a filter indicating whether the second grammar module is usable, or the endpoint identifier for communicating with the second grammar module.

12. The system of claim 7 wherein the command engine is further configured for:

sending, to the grammar module, at least the portion of the free-form information; and receiving, from the grammar module, a valid portion of the at least one compatible command.

13. A non-transitory computer readable medium having stored thereon executable instructions which, when executed by at least one processor of a computer, cause the computer to perform steps comprising:
   receiving free-form information for requesting or modifying information about a computing system;
   identifying a portion in the free-form information that is unsupported by a command engine;
   sending, via a broadcast or multicast network address, at least some of the free-form information to two or more grammar modules for requesting assistance with processing the portion, wherein each of the two or more grammar modules is configured to receive requests for assistance sent to the broadcast or multicast network address and to respond to the requests that it is capable of supporting;
   receiving a response from the grammar module that supports the portion;
   converting, using the grammar module that supports the portion, the free-form information into at least one compatible command for interacting with at least one data set; and
   requesting or modifying the information about the computing system by interacting with the at least one data set using the at least one compatible command.

14. The non-transitory computer readable medium of claim 13 wherein converting, using the grammar module, the free-form information into the at least one compatible command comprises generating a sequence of commands, wherein at least one command in the sequence of commands is configured to use results from a previous command in the sequence of commands.

15. The non-transitory computer readable medium of claim 13 comprising further executable instructions which, when executed by at least one processor of a computer, cause the computer to perform further steps comprising:
   receiving second free-form information for requesting or modifying second information about the computing system;
   identifying a second portion in the free-form information that is unsupported by the command engine;
   requesting, from a grammar module registry, information about a second grammar module that supports the second portion; and
   receiving, from the grammar module registry, an endpoint identifier for communicating with the second grammar module.

16. The non-transitory computer readable medium of claim 15 wherein requesting, from the grammar module registry, information about the second grammar module that supports the second portion comprises:
   sending at least some of the second free-form information to the grammar module registry;
   determining whether the second grammar module supports the second portion;
   in response to determining that the second grammar module supports the second portion, determining whether usage requirements for utilizing the second grammar module are satisfied; and
   in response to determining that the usage requirements are satisfied, sending the endpoint identifier for communicating with the second grammar module that supports the second portion and meets the usage requirements.

17. The non-transitory computer readable medium of claim 15 wherein the second grammar module registers with the grammar module registry by registering the second portion that is supported by the grammar module, a required parameter indicating an object or a value needed for supporting the second portion, a predicate indicating a condition to be satisfied before supporting the second portion, a filter indicating whether the second grammar module is usable, or the endpoint identifier for communicating with the second grammar module.

18. The non-transitory computer readable medium of claim 13 wherein converting, using the grammar module that supports the portion, the free-form information into the at least one compatible command comprises:
   sending, to the grammar module, at least the portion of the free-form information; and
   receiving, from the grammar module, a valid portion of the at least one compatible command.

* * * * *